(12) United States Patent
Gelon

(10) Patent No.: US 8,448,902 B2
(45) Date of Patent: May 28, 2013

(54) SATELLITE HAVING MULTIPLE ASPECT RATIOS

(75) Inventor: Walter Gelon, Redwood City, CA (US)

(73) Assignee: Space Systems/Loral LLC, Palo Alto, CA (US)

( * ) Notice: Subject to any disclaimer, the term of this patent is extended or adjusted under 35 U.S.C. 154(b) by 183 days.

(21) Appl. No.: 13/026,175

(22) Filed: Feb. 11, 2011

(65) Prior Publication Data

US 2012/0205492 A1   Aug. 16, 2012

(51) Int. Cl.
*B64G 1/00* (2006.01)
*B64G 1/10* (2006.01)

(52) U.S. Cl.
CPC ........................................ *B64G 1/10* (2013.01)
USPC .................................... 244/158.1; 244/159.4

(58) Field of Classification Search
USPC .......... 244/172.7, 172.6, 159.6, 159.5, 159.4, 244/158.1
See application file for complete search history.

(56) References Cited

U.S. PATENT DOCUMENTS

| | | | |
|---|---|---|---|
| 4,384,692 A | 5/1983 | Preukschat | |
| 4,508,297 A | 4/1985 | Mouilhayrat et al. | |
| 5,833,175 A | 11/1998 | Caplin | |

FOREIGN PATENT DOCUMENTS

| | | |
|---|---|---|
| EP | 0 780 294 | 6/1997 |
| FR | 2 476 018 | 8/1981 |
| FR | 2 522 614 | 9/1983 |
| RU | 2 092 398 | 10/1997 |

OTHER PUBLICATIONS

International Search Report and Written Opinion dated Jan. 17, 2012 issued in PCT Application No. PCT/US2011/049190 (12 pages).

*Primary Examiner* — Tien Dinh
*Assistant Examiner* — Richard R Green
(74) *Attorney, Agent, or Firm* — Weaver Austin Villeneuve & Sampson LLP

(57) ABSTRACT

A high capacity satellite having multiple aspect ratios is configured to have at least two modules. Each module includes a first panel and a third panel facing, in an on-orbit configuration, respectively, toward north and south and having a width in an east-west direction (EW width); and a second and a fourth panel oriented, in the on-orbit configuration, respectively, east and west and having a width in the north-south direction (NS width). Each module has a respective aspect ratio of EW width to NS width, a first module is configured with a first aspect ratio, a second module is configured with a second aspect ratio; and the second aspect ratio is substantially larger than the first aspect ratio. At least one antenna reflector is disposed, during launch, proximate to at least one of the first and third panel of the second module.

12 Claims, 7 Drawing Sheets

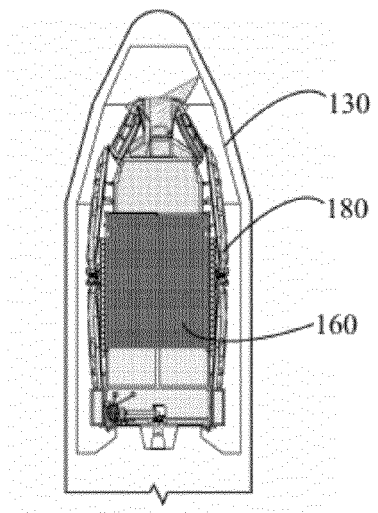
FIG. 1B—PRIOR ART
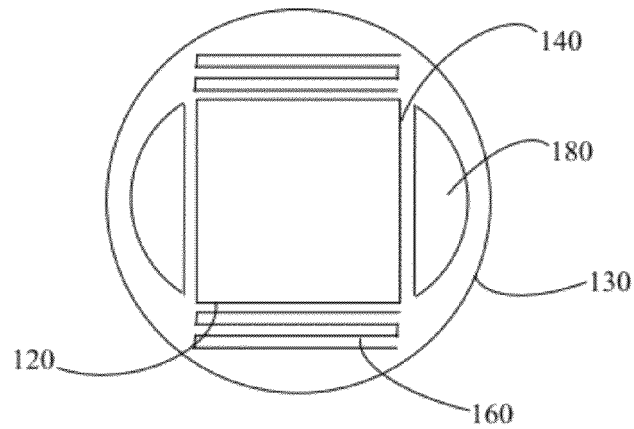
FIG. 1C—PRIOR ART
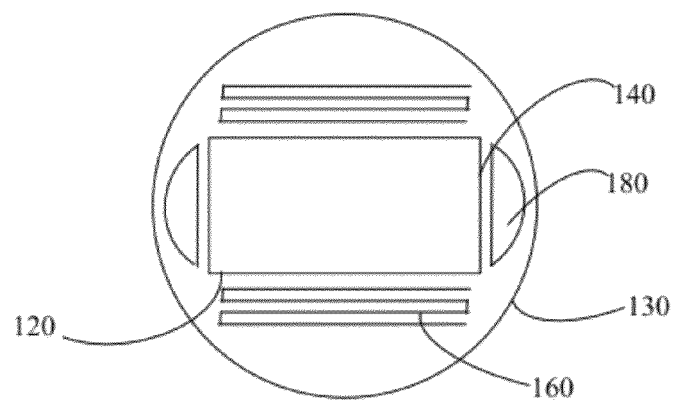
FIG 1D—PRIOR ART

SATELLITE HAVING MULTIPLE ASPECT RATIOS

TECHNICAL FIELD

This invention relates generally to a spacecraft providing communications and/or broadcast service, and particularly to a configuration of such satellite having multiple aspect ratios.

BACKGROUND OF THE INVENTION

The assignee of the present invention manufactures and deploys spacecraft for, inter alia, communications and broadcast services. Market demands for such spacecraft have imposed increasingly stringent requirements on spacecraft payload capacity. To meet these demands, higher power spacecraft with larger antenna apertures are desirable.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with the mass and fairing envelope constraints of such launch vehicles as, for example, Ariane V, Atlas XEPF, Proton, and Sea Launch.

Thus, there is a need for a high capacity spacecraft that is compatible with such conventional launch vehicle constraints.

SUMMARY OF INVENTION

The present inventor has recognized that a high capacity spacecraft payload may be achieved by a satellite having a "multiple aspect ratio" configuration that permits substantially larger spacecraft elements, including north and south radiator surfaces, antenna reflectors, and solar array panels, to be configured for launch within the launch envelope of conventional launch vehicles. As a result of the multiple aspect ratio configuration, a spacecraft may be configured to consist of at least two modules, each module comprising four external panels. For each module, a first and third external panel may be configured to normally face, in an on-orbit configuration, respectively, toward north and south; a second and a fourth external panel, may be configured to normally face, in the on-orbit configuration, respectively, east and west. Each of the first and third panels may have a width in an east-west direction (EW width); each of the second and fourth panels may have a width in a north-south direction (NS width). Each module has a respective aspect ratio of EW width to NS width. The first module may be configured with a first aspect ratio, and the second module may be configured with a second aspect ratio such that the second aspect ratio is substantially larger than the first aspect ratio.

The first module, for example, may be configured such that the EW width of the first and third panels is substantially equal to the NS width of the second and fourth panel. Accordingly, the first aspect ratio may be approximately one. The second module may be configured such that the EW width of the first and third panel is substantially larger than the NS width of the second and fourth panel. Accordingly, the second aspect ratio may be substantially larger than one. At least one antenna reflector may be disposed, in a launch configuration, proximate to one of the first panel and the third panel of the second module.

In an embodiment, a spacecraft may comprise at least two modules, each module comprising a first panel and a third panel substantially facing, in an on-orbit configuration, respectively, toward north and south and having a width in an east-west direction (EW width); and a second and a fourth panel substantially facing, in the on-orbit configuration, respectively, east and west and having a width in the north-south direction (NS width). Each module has a respective aspect ratio of EW width to NS width, a first module may be configured with a first aspect ratio, a second module may be configured with a second aspect ratio. The second aspect ratio may be substantially larger than the first aspect ratio. At least one antenna reflector may be disposed, in a launch configuration, proximate to one of the first panel and third panel of the second module.

In a further embodiment, at least one antenna reflector may have a major diameter approximately equal to or greater than the EW width of the first panel of the second module.

In another embodiment, the first module comprises a launch vehicle mating interface. The launch vehicle mating interface may be disposed, in the on-orbit configuration, facing the Earth.

In a further embodiment, the at least one antenna reflector may be disposed, in the on-orbit configuration, in an easterly or westerly direction with respect to the at least two modules. The at least one antenna reflector may be disposed, in the on-orbit configuration, a substantial distance in the anti-Earth direction from a payload feed element.

In a yet further embodiment, thermal radiators may be disposed on an external surface of at least one of the first panel and the third panel of at least one of the first module and the second module, and at least one antenna reflector may be disposed, in the launch configuration, to at least partially cover the thermal radiators.

In another embodiment, at least one solar array panel may be disposed, during launch, proximate to at least one of the first and third panel of the first module. The at least one solar array panel may be deployed, in the on-orbit configuration, in a northerly or southerly direction with respect to the at least two modules.

In a further embodiment, the first aspect ratio may be in the range of approximately 0.8 to 1.2, and the second aspect ratio may be least 1.5. Advantageously, the second aspect ratio may be at least three.

In another embodiment, at least two antenna reflectors may be disposed, in the launch configuration, proximate to one of the first panel and third panel of the second module.

BRIEF DESCRIPTION OF THE DRAWINGS

Features of the invention are more fully disclosed in the following detailed description of the preferred embodiments, reference being had to the accompanying drawings, in which.

Figure 1A:
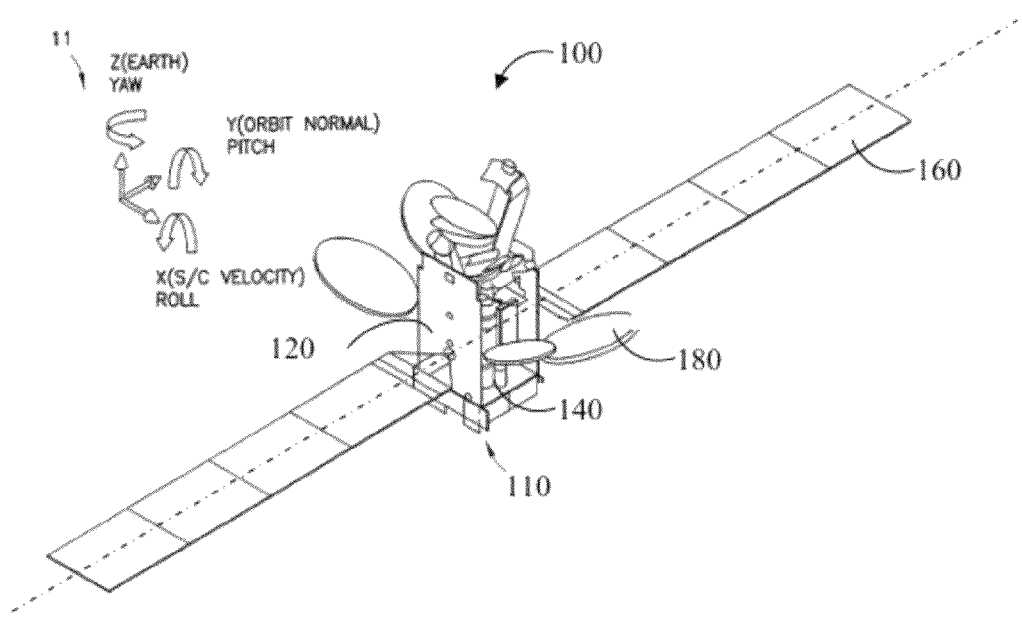
FIG. 1 illustrates a satellite configuration of the prior art.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The term "panel" or "panel surface" as used herein, unless otherwise expressly indicated, refers to a substantially planar geometric feature defining an exterior feature of a spacecraft module. Such a panel or panel surface may not necessarily be structurally contiguous. For example, in an embodiment, a panel may have one or more openings; moreover, a panel surface may be defined by non-structural elements, such as, for example, thermal blankets.

The present inventor has recognized that a high capacity spacecraft payload may be achieved by a satellite configured to have multiple aspect ratios, whereby substantially larger spacecraft elements, including north south radiator surfaces, antenna reflectors and solar array panels, may be configured for launch within the launch envelope of conventional launch vehicles. The term "multiple aspect ratio" as used herein, and in the claims, may be better understood by first referring to FIG. 1 which depicts a satellite configuration of the prior art. Referring to FIG. 1A, an Earth-pointing three axis stabilized satellite 100 is illustrated with respect to a reference spacecraft body coordinate frame 11 having roll (x), pitch (y) and yaw (z) axes. Conventionally, the yaw axis is defined as being directed along a line intersecting the Earth center of mass and spacecraft center of mass; the roll axis is defined as being perpendicular to the yaw axis, lying in the plane of the orbit in the direction of the spacecraft velocity vector; and the pitch axis (y), normal to the orbit plane, completes a three-axis, right-hand orthogonal system. Satellite 100 has a main body 110 substantially in the form of a rectangular cuboid. A first panel surface 120, orthogonal to the y-axis faces generally north when the satellite is in an on-orbit configuration, and may be referred to hereinafter as the north panel. A second panel surface 140, orthogonal to the x-axis, may be referred to hereinafter as the east panel. A third panel surface and a fourth panel surface (not shown), disposed opposite, respectively, to north panel 120 and east panel 140 will be referred to hereinafter, respectively, as the south panel and the west panel. Each of the north and south panels has a first substantially equal width in the east-west direction (EW width); each of the east and west panels has a second substantially equal width in the north-south direction (NS width). The ratio of the EW width of a north/south panel to the NS width of an east/west panel will be referred to herein as the aspect ratio.

Satellite main body 110 contains internal payload and bus equipment (not shown) and is structurally coupled to external elements of satellite 100, notably one or more solar arrays 160 and antenna reflectors 180.

Referring now to FIG. 1B, a launch configuration of satellite 100 is illustrated in, respectively, elevation view, together with a typical launch vehicle fairing envelope 130. A simplified schematic plan view is illustrated in FIG. 1C. It may be observed that, in the launch configuration, solar array 160, and antenna reflectors 180 are disposed proximate to, respectively, north panel 120 and east panel 140.

Because operating internal payload and bus equipment dissipate heat and may be damaged by temperature extremes, such equipment is preferably mounted on a north or south panel. On-orbit, the north or south panels experience a solar radiation exposure that is relatively low and stable compared to the east/west panels which experience significant diurnal cycles as the spacecraft orbits the Earth. As a result, a higher aspect ratio is preferable for purposes of maximizing equipment mounting area availability on a north/south panel.

Referring now to FIG. 1D, it may be observed that, in the absence of the teachings of the present inventor, increasing the aspect ratio in order to increase equipment mounting area availability on a north/south panel undesirably constrains the volume available for east/west mounted external components, particularly antenna reflectors 180.

The present inventor has appreciated that the foregoing problem may be solved by by configuring a satellite to have at least two aspect ratios.

Figure 2A:
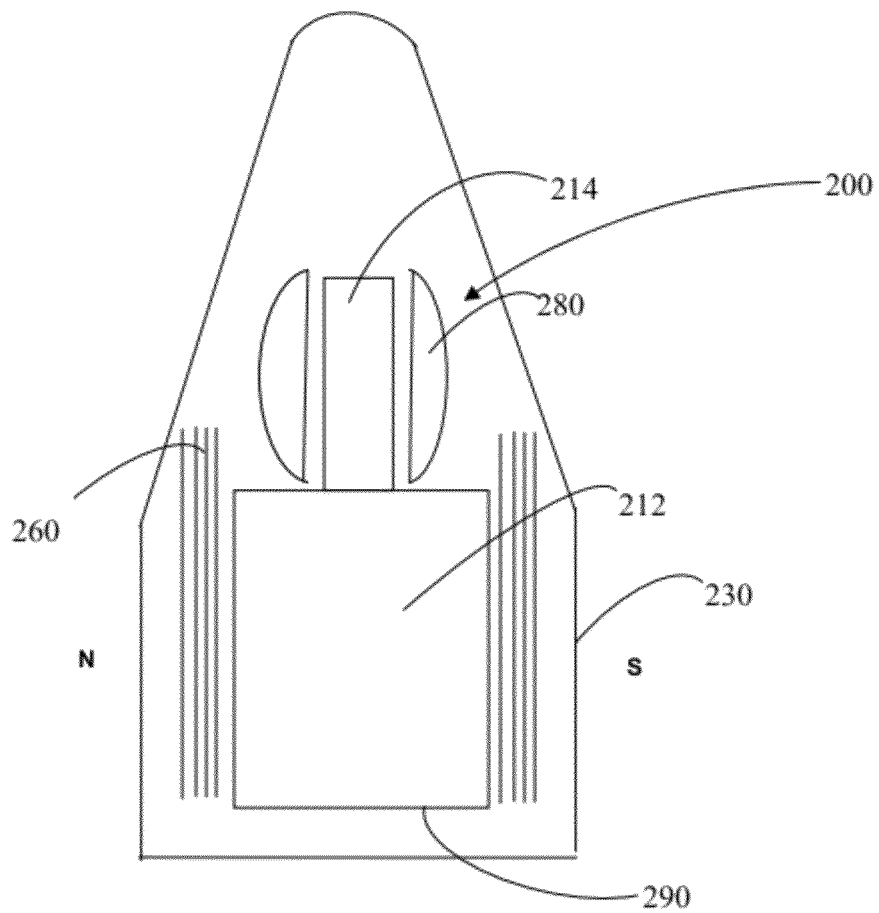
FIG. 2 illustrates an embodiment of a satellite configured to have multiple aspect ratios.
Figure 2B:
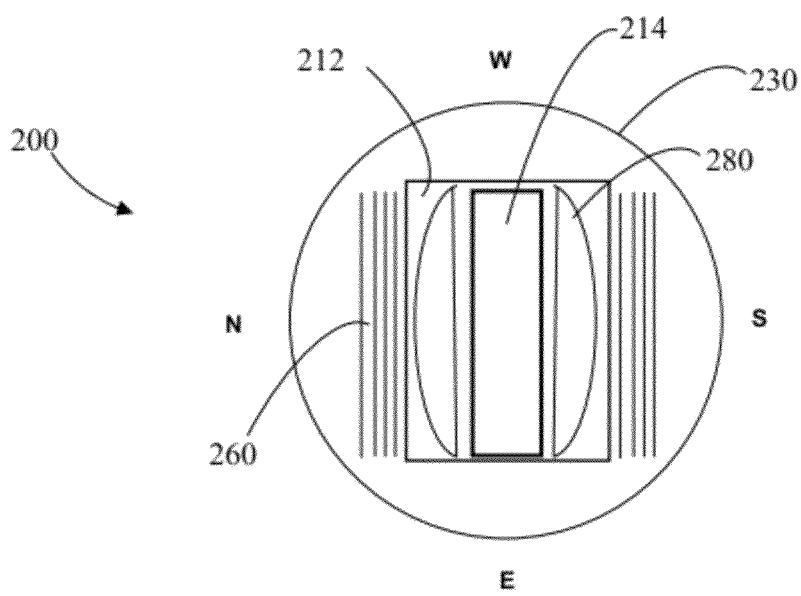

Referring now to FIG. 2, a conceptual view of an embodiment will be described. Satellite 200 is illustrated in FIGS. 2A and 2B in, respectively, elevation and plan views of a launch configuration, together with a typical launch vehicle fairing envelope 230. Satellite body 200 may consist of a first module 212, and a second module 214. In an embodiment, each of module 212 and module 214 may consist of a first panel and a third panel facing, in an on-orbit configuration, respectively, toward north and south, and having an EW width; and a second panel and a fourth panel facing, in an on-orbit configuration, respectively, east and west, and having a NS width. Advantageously, first module 212 may be configured to have an aspect ratio substantially smaller than the aspect ratio of second module 214. Thus, for example, the EW width of the first and third panel of first module 212 may be approximately equal to the NS width of the second and fourth panel of first module 212, whereas, the EW width of the first and third panel of second module 214 may be substantially larger than the NS width of the second and fourth panel of second module 214. In an embodiment, the aspect ratio of the second module may be approximately 3:1.

In an embodiment, at least one antenna reflector 280 may be disposed, during launch, proximate to one of the first and third panels of second module 214. Advantageously, the large aspect ratio of second module 214 permits antenna reflector 280 to be substantially larger than permitted by conventional satellite configurations. In an embodiment, at least one solar array panel 260 may be disposed during launch, proximate to one of the first and third panel of first module 212.

As a result of the disclosed multiple aspect ratio configuration, substantially larger spacecraft elements, including north and south radiator surfaces, antenna reflectors and solar array panels, may be configured for launch within the launch envelope constraints of conventional launch vehicles. For example, where the NS width of the east panel and the west panel of second module 214 is smaller than the NS width of the east panel and west panel of first module 212, volume is made available within which antenna reflector 280 may be disposed during launch. Advantageously, a major axis of antenna reflector 280 may have a diameter substantially equal to or greater than the EW width of either module. In an embodiment, the EW width of second module 214 may equal or exceed the EW width of first module 212.

Advantageously, thermal radiators may be disposed on the exterior surfaces of north and/or south panels of each of first module 212 and second module 214. In an embodiment one or each of first module 212 and second module 214 may have each of its respective north and south panels thermally interconnected by, for example, crossing heat pipes or thermally conductive straps. Additionally, or alternatively, the north and/or south panels may be thermally interconnected to an east and/or west panel in a similar manner. Advantageously, panels of first module 212 may likewise be thermally interconnected to panels of second module 214. Because the multiple aspect ratio configuration disclosed herein substantially increases the availability of desirable north/south facing radiator area, the expense and complexity of deployable thermal radiators may be avoided.

In a launch configuration antenna reflectors 280 may at least partially cover thermal radiators disposed on north and south panels of module 214. Advantageously, antenna reflectors 280 may remain in the launch configuration during transfer orbit, thereby effectively reducing the amount of thermal radiator area exposed during transfer orbit, when power generated by the solar arrays is typically limited, and heater power is required to keep the non-operating payload equipment above a specified minimum temperature. Once on-orbit, antenna reflectors 280 may be deployed as required for the payload operations and also uncover the north and south facing radiators.

In an embodiment, first module 212 may be the lower, or aft, module when the satellite is disposed in the launch configuration, and may incorporate a launch vehicle mating interface 290. In a first on-orbit configuration, launch vehicle interface 290 may be facing in an anti-Earth direction. In another embodiment, launch vehicle interface 290 may be facing, in a second on-orbit configuration, the Earth. The second on-orbit configuration may be referred to as an "inverted" configuration.

Figure 3:
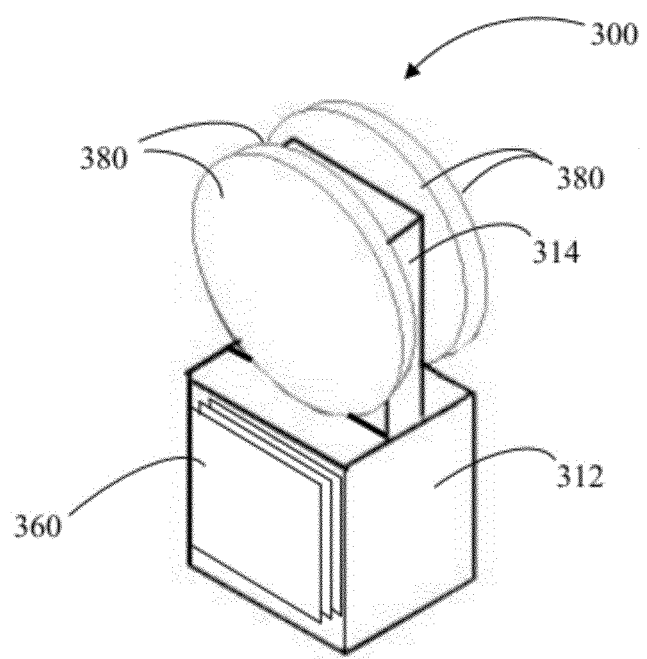
FIG. 3 illustrates a further embodiment of a satellite configured to have multiple aspect ratios.

Referring now to FIG. 3, another embodiment will be described, illustrating an example of use of a multiple aspect ratio configuration in a complex satellite configuration, as it may be disposed in a launch configuration. FIG. 3 illustrates an isometric view of satellite 300. In an embodiment, one or more large diameter antenna reflectors 380 may be disposed proximate to north/south panels of module 314. Advantageously, two or more antenna reflectors 380 may be disposed, respectively, proximate to, for example, a north panel of module 314 while an additional two or more antenna reflectors may be disposed proximate to a south panel of module 314. Solar arrays 360 may be disposed proximate to north/south panels of module 312.

Figure 4:
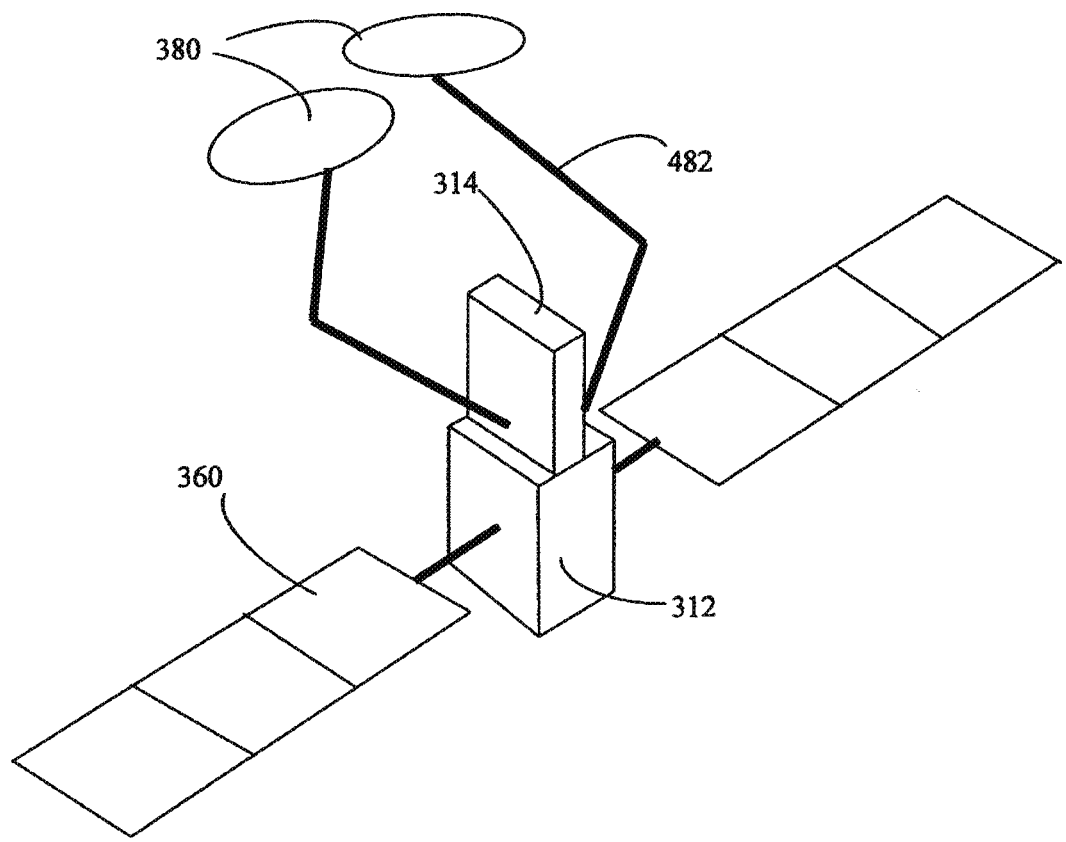
FIG. 4 illustrates an embodiment of a satellite having multiple aspect ratios as configured in an on-orbit configuration.

Referring now to FIG. 4, satellite 300 is illustrated as it may be deployed in an on-orbit configuration. Each of two solar arrays 360 may be disposed, in the on-orbit configuration, substantially outboard of the satellite, generally extending north and south of, respectively, a north panel and a south panel of module 312. Each antenna reflector 380 may be disposed, in the on-orbit configuration, substantially outboard of the satellite, generally extending in an eastward and westward direction of, respectively, an east panel and a west panel of module 314. Advantageously, a long antenna focal length may be provided by a deployment mechanism and related structure 482 that also disposes antenna reflectors 380, in the on-orbit configuration, a substantial distance in the anti-earth direction with respect to payload feed elements. The payload feed elements (not shown) may, advantageously, be disposed on an east/west panel of module 312 or 314.

Figure 5:
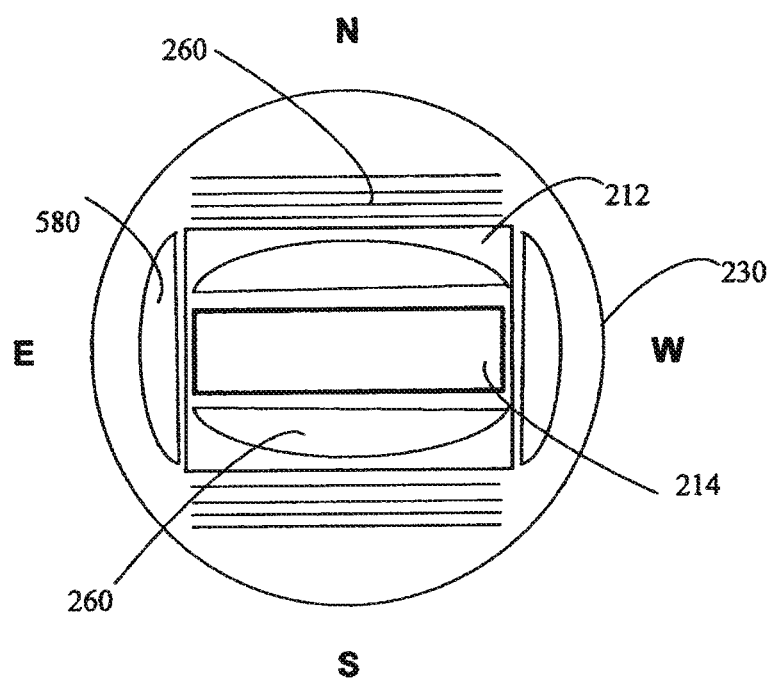
FIG. 5 illustrates another embodiment of a satellite configured to have multiple aspect ratios.

Referring now to FIG. 5, antenna reflectors 580 may, additionally, be disposed, during launch proximate to an east/west surface of module 212 and/or module 214.

Figure 6:
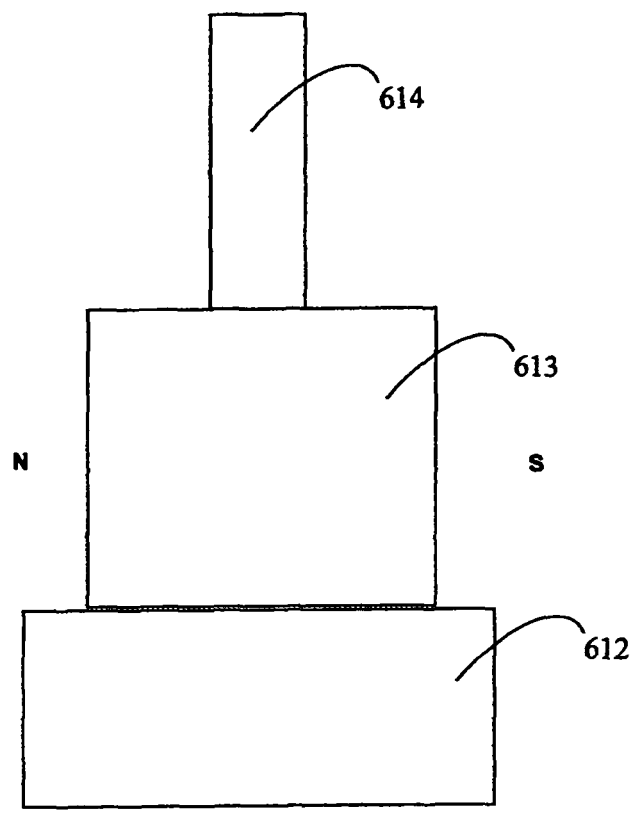
FIG. 6 illustrates another embodiment of a satellite configured to have multiple aspect ratios.

Referring now to FIG. 6, it may be observed that a multiple aspect ratio configuration may be configured to provide three modules, each having a distinct aspect ratio. For example, a first module 612 a second module 614 and a third module 613 may be provided. In an embodiment first module 612 may be a "bus module" comprising mainly non-payload equipment. A third module 613 may comprise a first payload module and be configured to provide a larger aspect ratio than first module 612. Second module 614, as described above may have a substantially larger aspect ratio than first module 612 or third module 613. In addition to being configured to contain payload equipment and have north south panels with thermal radiators, second module 614 may be configured to provide volume outboard of and proximate to the north and south panels, within which large diameter antenna reflectors (not shown) may be disposed.

Although the embodiments described above relate to modules configured as rectangular cuboids having four panel surfaces oriented, respectively, north, south, east, and west, the teachings of the present disclosure are not so limited. A spacecraft configuration with multiple aspect ratios in accordance with the present invention may be accommodated by spacecraft modules having, for example, six or eight panels.

Thus, a high capacity satellite has been disclosed, wherein a multiple aspect ratio configuration provides substantial advantages over the prior art, including, but not limited to enabling increased thermal radiator area, and larger diameter antenna reflectors while complying, in a launch configuration, with the constraints of conventional launch vehicle fairings.

What is claimed is:
1. A spacecraft, comprising:
at least two modules, each said module comprising:
  a first panel and a third panel substantially facing, in an on-orbit configuration, respectively, toward north and south and having a width in an east-west direction (EW width); and a second and a fourth panel substantially facing, in the on-orbit configuration, respectively, east and west and having a width in the north-south direction (NS width), wherein, whether in the on-orbit configuration or in a launch configuration:
  each said module has a respective aspect ratio of EW width to NS width;
  a first module is configured with a first aspect ratio;
  a second module is configured with a second aspect ratio; and
  the second aspect ratio is substantially larger than the first aspect ratio, wherein the second aspect ratio is at least 20% larger than the first aspect ratio.

2. The spacecraft according to claim 1, further comprising at least one antenna reflector, the antenna reflector having an aperture, wherein the antenna reflector is disposed, in the launch configuration, such that the aperture is proximate to and substantially parallel with one of the first panel and the third panel of the second module.

3. The spacecraft according to claim 2, wherein the at least one antenna reflector has a major diameter approximately equal to or greater than the EW width of the first panel of the second module.

4. The spacecraft according to claim 2, wherein the at least one antenna reflector is disposed, in the on-orbit configuration, in an easterly or westerly direction with respect to the at least two modules.

5. The spacecraft according to claim 1, wherein the first module comprises a launch vehicle mating interface.

6. The spacecraft according to claim 5, wherein the launch vehicle mating interface is disposed, in the on-orbit configuration, facing the Earth.

7. The spacecraft according to claim 1, wherein a plurality of thermal radiators are disposed on an external surface of at least one of the first panel and the third panel of at least one of the first module and the second module, and at least one antenna reflector is disposed, in the launch configuration, to cover at least some of the plurality of thermal radiators.

8. The spacecraft according to claim 1, wherein at least one solar array panel is disposed, during launch, proximate to at least one of the first and third panel of the first module.

9. The spacecraft according to claim 8, wherein the at least one solar array panel is deployed, in the on-orbit configuration, in a northerly or southerly direction with respect to the at least two modules.

10. The spacecraft according to claim 1 wherein at least two antenna reflectors are disposed, in the launch configuration, proximate to one of the first panel and third panel of the second module.

11. A spacecraft, comprising:
at least two modules, each said module comprising:
a first panel and a third panel substantially facing, in an on-orbit configuration, respectively, toward north and south and having a width in an east-west direction (EW width); and a second and a fourth panel substantially facing, in the on-orbit configuration, respectively, east and west and having a width in the north-south direction (NS width), wherein, whether in the on-orbit configuration or in a launch configuration:
each said module has a respective aspect ratio of EW width to NS width;
a first module is configured with a first aspect ratio;
a second module is configured with a second aspect ratio; and
the first aspect ratio is in the range of approximately 0.8 to 1.2 and the second aspect ratio is at least 1.5.

12. The spacecraft according to claim 11, wherein the second aspect ratio is at least three.

* * * * *